United States Patent
Yadav et al.

(10) Patent No.: US 12,026,058 B2
(45) Date of Patent: Jul. 2, 2024

(54) INTELLIGENT INCLUSION OR EXCLUSION OF DATA FROM A BACKUP SET

(71) Applicant: Dell Products L.P., Round Rock, TX (US)

(72) Inventors: Sunil Yadav, Bangalore (IN); Shelesh Chopra, Bangalore (IN)

(73) Assignee: DELL PRODUCTS, Round Rock, TX (US)

( * ) Notice: Subject to any disclaimer, the term of this patent is extended or adjusted under 35 U.S.C. 154(b) by 0 days.

(21) Appl. No.: 17/952,451

(22) Filed: Sep. 26, 2022

(65) Prior Publication Data

US 2024/0103972 A1 Mar. 28, 2024

(51) Int. Cl.
  *G06F 16/00* (2019.01)
  *G06F 11/14* (2006.01)
  *G06F 16/16* (2019.01)

(52) U.S. Cl.
  CPC ........ *G06F 11/1451* (2013.01); *G06F 16/164* (2019.01); *G06F 2201/84* (2013.01)

(58) Field of Classification Search
  None
  See application file for complete search history.

(56) References Cited

U.S. PATENT DOCUMENTS

| | | | |
|---|---|---|---|
| 8,495,368 B1 * | 7/2013 | te Grotenhuis | H04L 67/1095 713/166 |
| 8,527,549 B2 | 9/2013 | Cidon | |
| 9,430,331 B1 | 8/2016 | Basov et al. | |
| 9,798,639 B2 | 10/2017 | Allen et al. | |
| 10,055,420 B1 | 8/2018 | Pogde et al. | |
| 2002/0169740 A1 | 11/2002 | Korn | |
| 2007/0220503 A1 | 9/2007 | Fan et al. | |
| 2008/0115071 A1 | 5/2008 | Fair | |
| 2009/0182789 A1 | 7/2009 | Sandorfi et al. | |
| 2010/0274772 A1 | 10/2010 | Samuels | |
| 2013/0018946 A1 * | 1/2013 | Brown | G06F 11/1451 709/203 |
| 2013/0332420 A1 | 12/2013 | Ha | |
| 2014/0067767 A1 | 3/2014 | Ganesh et al. | |
| 2015/0074060 A1 | 3/2015 | Varadharajan et al. | |
| 2016/0259809 A1 | 9/2016 | Diederich et al. | |
| 2017/0019556 A1 | 1/2017 | Sekine | |
| 2017/0364274 A1 * | 12/2017 | Hammons | G06F 11/1446 |
| 2019/0138515 A1 | 5/2019 | Prasanna et al. | |
| 2020/0285609 A1 | 9/2020 | Guo et al. | |
| 2022/0334925 A1 | 10/2022 | Rakesh et al. | |
| 2023/0094628 A1 | 3/2023 | Yadav et al. | |

* cited by examiner

*Primary Examiner* — Anhtai V Tran
(74) *Attorney, Agent, or Firm* — Chamberlain, Hrdlicka, White, Williams & Aughtry; Aly Z. Dossa (57) ABSTRACT

Embodiments of the invention relate to methods and systems for predicting what files and/or folders will be skipped during a backup based on the file system's meta-data. Various embodiments of the invention may determine based on a file system's meta-data that specific files and/or folders will not be backed up in accordance with a backup's current rules or configuration. The aforementioned information can then be used to notify a user or administrator what files and/or folders will not be backed up and based on that notification, they may make changes to the backup's current rules or configuration. This advantageously provides the user or administrator knowledge of gaps in the protection provided by a backup and the ability to configure it to meet their needs.

17 Claims, 4 Drawing Sheets

INTELLIGENT INCLUSION OR EXCLUSION OF DATA FROM A BACKUP SET

BACKGROUND

As people increasingly rely on computing systems and devices to perform a plethora of tasks; the systems have become increasingly complex, and the opportunities for failure and/or loss of important data has also increased. To prevent loss of important data, performing a backup on the file system of a computing system is necessary to prevent loss of data if a system failure occurs or cyberattacks, such as ransomware, are directed towards the system. File system backups leverage a file-based backup philosophy to protect the underlying data. This underlying mechanism is leveraged not just to protect the file system on a host, but also to protect workflows in network attached storage.

SUMMARY

In general, certain embodiments described herein relate to a method for performing a backup. The method comprises of initiating, by a user of a target production host, a backup of the target production host. The method then produces a plurality of backup scenarios using at least the meta-data of a file system of the target production host. The plurality of backup scenarios is displayed to the user and then modified. The method then receives from the user a selection of one of the modified one or more plurality of backup scenarios and performs the backup of the target production host based on the selection of one of the modified one or more of the plurality of backup scenarios.

In general, certain embodiments described herein relate to a non-transitory computer readable medium comprising computer readable program code, which when executed by a computer processor enables the computer processor to perform a method for performing a backup. The method comprises of initiating, by a user of a target production host, a backup of the target production host. The method then produces a plurality of backup scenarios using at least the meta-data of a file system of the target production host. The plurality of backup scenarios is displayed to the user and then modified. The method then receives from the user a selection of one of the modified one or more plurality of backup scenarios and performs the backup of the target production host based on the selection of one of the modified one or more of the plurality of backup scenarios.

In general, certain embodiments described herein relate to a system comprising: a storage device associated with a target production host that includes a target file system comprising of folders and files, a processor, and memory. The memory includes instructions, which when executed by the processor, perform a method for performing a backup. The method comprises of initiating, by a user of a target production host, a backup of the target production host. The method then produces a plurality of backup scenarios using at least the meta-data of a file system of the target production host. The plurality of backup scenarios is displayed to the user and then modified. The method then receives from the user a selection of one of the modified one or more plurality of backup scenarios and performs the backup of the target production host based on the selection of one of the modified one or more of the plurality of backup scenarios.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

In the following description of the figures, any component described with regards to a figure, in various embodiments of the invention, may be equivalent to one or more like-named components described with regards to any other figure. For brevity, descriptions of these components will not be repeated with regards to each figure. Thus, every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regards to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, a backup (e.g., a full backup, an incremental backup, etc.) may include files and/or folders that are skipped for various reasons. Embodiments of the invention relate to methods and systems for predicting what files and/or folders will be skipped during the backup based on the file system's meta-data. More specifically, various embodiments of the invention may determine based on a file system's meta-data that specific files and/or folders will not be backed up in accordance with a backup's current rules or configuration. The aforementioned information may be stored, e.g., in a file, as a list of files and/or folders that will not be backed up along with other meta-data. This data can then be used to notify a user or administrator what files and/or folders will not be backed up and, based on that notification, the administrator may make changes to the backup's current rules or configuration. This advantageously provides the user or administrator knowledge of gaps in the protection provided by a backup and the ability to update the configuration of the backup policies in order to meet the specific needs of the user and/or administrator.

The following describes various embodiments of the invention.

Figure 1A:
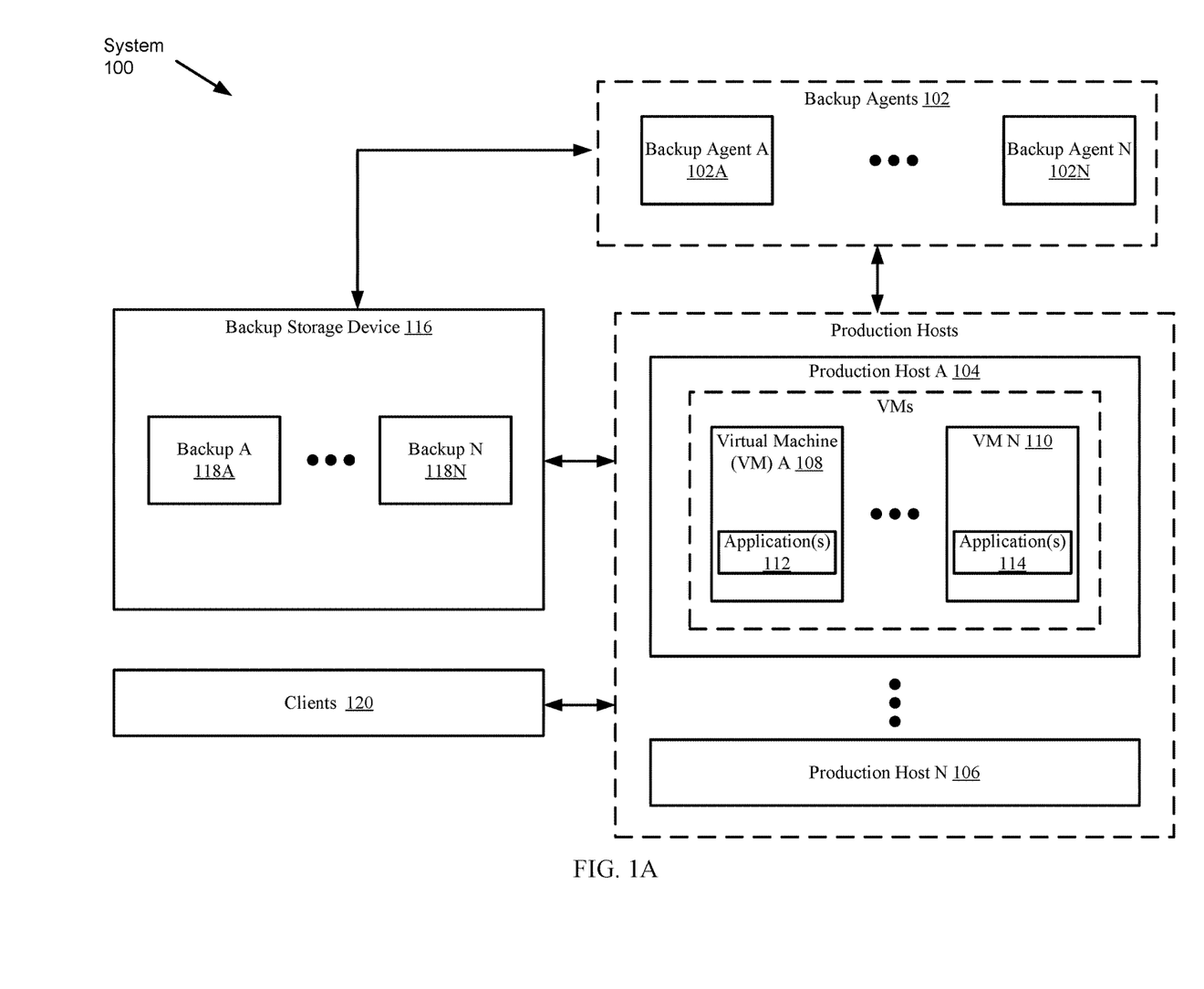
FIG. 1A shows a diagram of a system in accordance with one or more embodiments of the invention.

FIG. 1A shows a diagram of a system in accordance with one or more embodiments of the invention. The system includes backup agents (102), production hosts (104, 106), a backup storage device (116), and clients (120). The system may include additional, fewer, and/or different components without departing from scope of the invention. Each component may be operably connected to any of the other component via any combination of wired and/or wireless connections. Each component illustrated in FIG. 1A is discussed below.

In one or more embodiments of the invention, the backup agents (e.g., 102A, 102N) may generate and provide to the backup storage device (116) the backups and the historical meta-data based on backup policies implemented by the backup agents (e.g., 102A, 102N). The backup policies may specify a schedule in which applications (e.g., 112, 114) or other assets, such as, but not limited to, individual files or folders, associated with virtual machines (e.g., 108, 110) running on a production host (e.g., 104, 106) are to be backed up. The backup agent (e.g., 102A, 102N) may be triggered to provide file system meta-data, generate a backup (e.g., 118A, 118N), and generate backup meta-data and provide the backup and file system and backup meta-data to the backup storage device (116) in response to a backup policy or in response to a backup request triggered by the client(s) (e.g., 120). The backup request may specify the applications(s) (e.g., 112, 114) and/or assets associated with the applications (e.g., 112, 114) to be backed up.

In one or more embodiments of the invention, the backup agent (102) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (102) described throughout this application.

In one or more embodiments of the invention, the backup agent (102) is implemented as computer instructions, e.g., computer code, stored on a persistent storage that when executed by a processor of the production hosts (e.g., 104, 106) causes the production hosts (e.g., 104, 106) to provide the functionality of the backup agents (e.g., 102A, 102N) described throughout this application.

In one or more embodiments of the invention, the production host (e.g., 104, 106), hosts one or more virtual machines (e.g., 108, 110), which host applications (e.g., 112, 114). In one or more embodiments of the invention, the application(s) (e.g., 112, 114) perform computer implemented services for clients (e.g., 120). Performing the computer implemented services may include performing operations on asset data that is stored in the production host (e.g., 104). The operations may include creating elements of assets, moving elements of assets, modifying elements of assets, deleting elements of assets, and other and/or additional operations on asset data without departing from the invention. The application(s) (e.g., 112, 114) and/or users of the client(s) (120) may include functionality for performing the aforementioned operations on the asset data in the production host (e.g., 104, 106). The application(s) (e.g., 112, 114) may be, for example, instances of databases, email servers, and/or other applications. The production host (e.g., 104, 106) may host other types of applications without departing from the invention.

In one or more embodiments of the invention, the application(s) (e.g., 112, 114) are implemented as computer instructions, e.g., computer code, stored on a persistent storage that when executed by a processor(s) of the production hosts (e.g., 104, 106) cause the production host (e.g., 104, 106) to provide the functionality of the application(s) (e.g., 112, 114) described throughout this application.

The production hosts (e.g., 104, 106) may include physical storage or logical storage that will be discussed in more detail with regards to FIG. 1B. The logical storage devices (e.g., virtualized storage) may utilize any quantity of hardware storage resources of any number of computing devices for storing data. For example, the persistent storage may utilize portions of any combination of hard disk drives, solid state disk drives, tape drives, and/or any other physical storage medium of any number of computing devices.

In one or more embodiments of the invention, the backup agents (e.g., 102) may provide backup services to the production hosts (e.g., 104, 106). The backup services may include generation and storage of backups in the backup storage device (116). The backups services may also include restoration of the production hosts (e.g., 104, 106) using the backups (e.g., 118A, 118N) stored in the backup storage device (116).

The backup agents (e.g., 102) may provide backup services to the production hosts (e.g., 104, 106) by orchestrating: (i) generation of backups of the production hosts (e.g., 104, 106), (ii) storage of backups (e.g., 118A, 118N) of the production hosts (e.g., 104, 106) on the backup storage device (116), (iii) consolidation of backup requests to reduce or prevent from generation of backups that are not useful for restoration purposes, and (iv) restoration of the production hosts (e.g., 104, 106) to previous states using backups (e.g., 118A, 118N) stored on the backup storage device (e.g., 116). The system may include any number of backup agents (e.g., 102A, 102N) without departing from the scope of the invention.

Additionally, to provide the backup services, the backup agents (e.g., 102A, 102N) may include functionality to generate and issue instructions to any component of the system of FIG. 1A. In one or more embodiments, the backup agents (e.g., 102A, 102N) may also generate instructions in response to backup requests from other entities.

In one or more embodiments of the invention, the backup agents (e.g., 102A, 102N) may generate such instructions in accordance with backup schedules that specify when backups are to be generated. In one or more embodiments, a backup schedule may lay out specific points in time for a backup process to be performed.

In one or more embodiments of the invention, to satisfy the above-discussed backup schedules, the backup agent (e.g., 102A, 102N) may monitor a backup window (e.g., 4 hours, 8 hours, etc.) to perform a single backup and/or multiple backups. Additionally, the backup agents (e.g., 102) may pause an ongoing backup if the backup exceeded the backup window. The backup agents (e.g., 102) may then resume the paused backup while performing a next backup in a parallel manner based on the backup schedule.

In one or more embodiments of the invention, the backup storage device (116) may provide data storage services. For example, the backup storage device (116) may store backups of the production hosts (e.g., 104, 106) in persistent storage system associated with the backup storage device (116). Alternatively, in one or more embodiments of the invention the backups (e.g., 118A, 118N) may be stored in storage associated with the production hosts (e.g., 104, 106).

The backup storage device (116) may also provide copies of the backups (e.g., 118A, 118N) to the backup agents (e.g., 102) and/or production hosts (e.g., 104, 106). The system may include any number of backup storage devices (e.g., 116) and backups (e.g., 118A, 118N) without departing from the scope of the invention.

Figure 3:
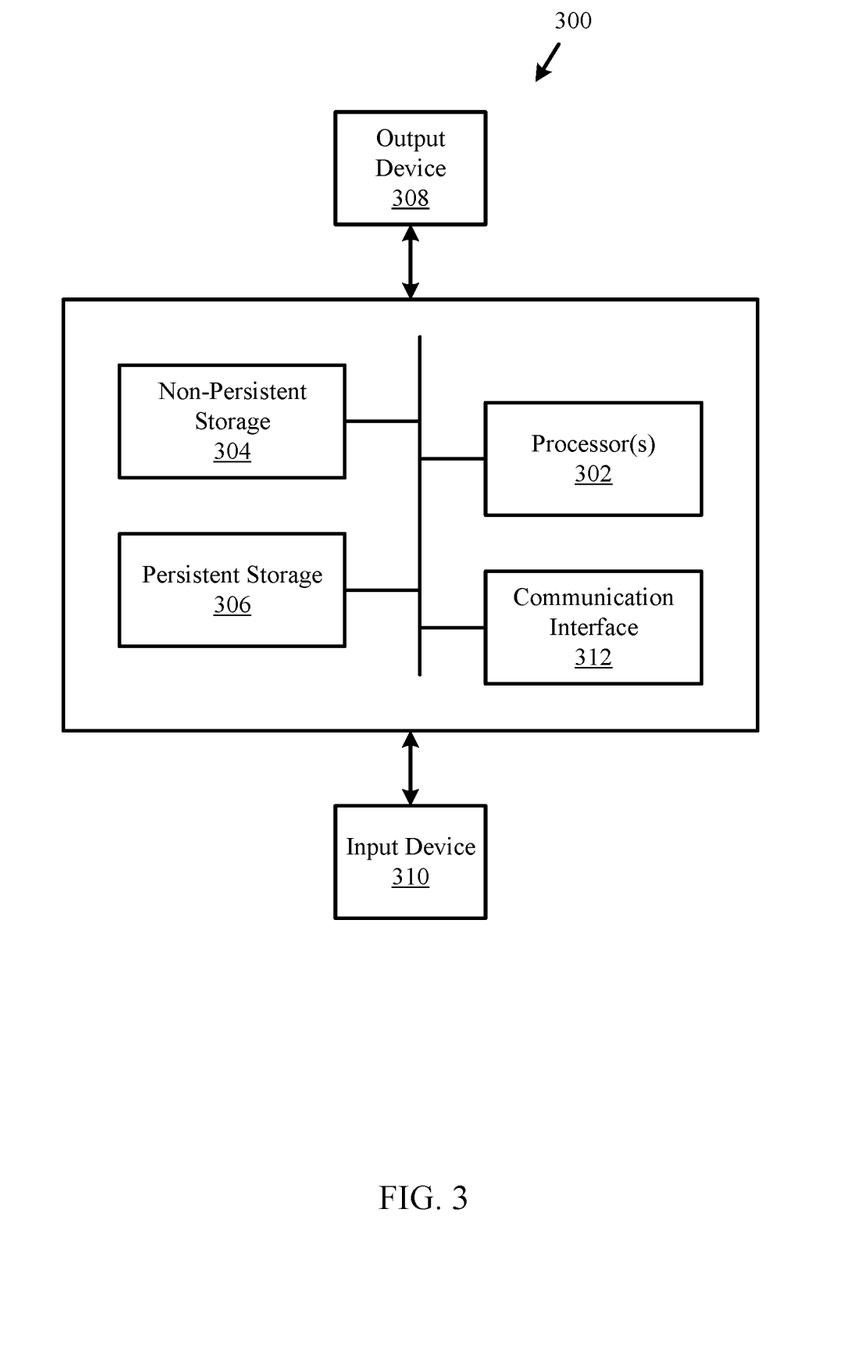
FIG. 3 shows a diagram of a computing device in accordance with one or more embodiments of the invention.

In one or more embodiments of the invention, the backup storage device (116) may be implemented as computing devices (e.g., 300, FIG. 3). A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the backup storage device (e.g., 116) described throughout this application. Alternatively, in one or more embodiments of the invention, the backup storage devices (e.g., 116) may also be implemented as logical devices, as discussed above.

In one or more embodiments of the invention, the production hosts (e.g., 104, 106) may provide services to the clients (e.g., 120). For example, the production hosts (e.g., 104, 106) may host any number of applications that provide application services to the clients (e.g., 120). Application services may include, but are not limited to database services, electronic communication services, instant messaging services, file storage services, etc.

In one or more embodiments of the invention, each of the production hosts (e.g., 104, 106) may provide the above-discussed application services by hosting applications. Each of the production hosts may host any number of applications. Additionally, different production hosts may host the same number of applications or different numbers of applications. Different production hosts may also host similar or different applications.

In one or more embodiments of the invention, the production hosts (e.g., 104, 106) may host virtual machines (VMs, e.g., 108, 110) that host the above-discussed applications. Each of the production hosts (e.g., 104, 106) may host any number of VMs (e.g., 108, 110) that, in turn, host any number of applications.

In one or more embodiments of the invention, the production hosts (e.g., 104, 106) may perform portions of a backup process. For example, the production hosts (e.g., 104, 106) may initiate backups under the direction of a backup agent (e.g., 102A) or backup agents (e.g., 102). In one or more embodiments, the production hosts (e.g., 104, 106) may include functionality to consolidate multiple backup generation requests so that duplicative backups are not generated because the duplicative backups may not be useful for restoration purposes.

In one or more embodiments of the invention, the production hosts (e.g., 104, 106) may include functionality to initiate multiple backups in a parallel manner. For example, the production hosts (e.g., 104, 106) may each host multiple backup processes that each manages the initiation of a respective backup. Each of the multiple backup processes may operate concurrently thereby causing multiple backups to be initiated in a parallel manner.

In one or more embodiments of the invention, the production hosts (e.g., 104, 106) may be implemented as computing devices (e.g., 300, FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid-state drives, etc.). The computing device may include instructions stored on the persistent storage, that when executed by the processor(s) of the computing device, cause the computing device to perform the functionality of the production hosts (e.g., 104, 106) described throughout this application.

Alternatively, in one or more embodiments of the invention, the production hosts (e.g., 104, 106) may also be implemented as logical devices, as discussed above.

In one or more embodiments of the invention, the clients (e.g., 120) may interact with the production hosts (e.g., 104, 106). For example, the clients (e.g., 120) may utilize application services provided by the production hosts (e.g., 104, 106). When the clients (e.g., 120) interact with the production hosts (e.g., 104, 106), data that is relevant to the clients (e.g., 120) may be stored on the production hosts (e.g., 104, 106). For example, consider a scenario in which the production hosts (e.g., 104, 106) host a database utilized by the clients (e.g., 120). In this scenario, the database may be a user database associated with the users of the clients (e.g., 120). When a new user is identified, the clients (e.g., 120) may add information regarding the new user to the database. By doing so, the data that is relevant to the clients (e.g., 120) may be stored in the production hosts (e.g., 104, 106). This may be done because the clients (e.g., 120) may desire access to the data regarding the new user at some point in time.

In one or more embodiments of the invention, the clients (e.g., 120) may include functionality to use services provided by the production hosts (e.g., 104, 106). For example, the clients (e.g., 120) may host local applications that interact with applications hosted by the production hosts (e.g., 104, 106).

In one or more embodiments of the invention, the clients (e.g., 120) may be implemented as computing devices (e.g., 300, FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the clients (e.g., 120) described throughout this application.

Alternatively, in one or more embodiments of the invention, the clients (e.g., 120) may also be implemented as logical devices, as discussed above.

Figure 1B:
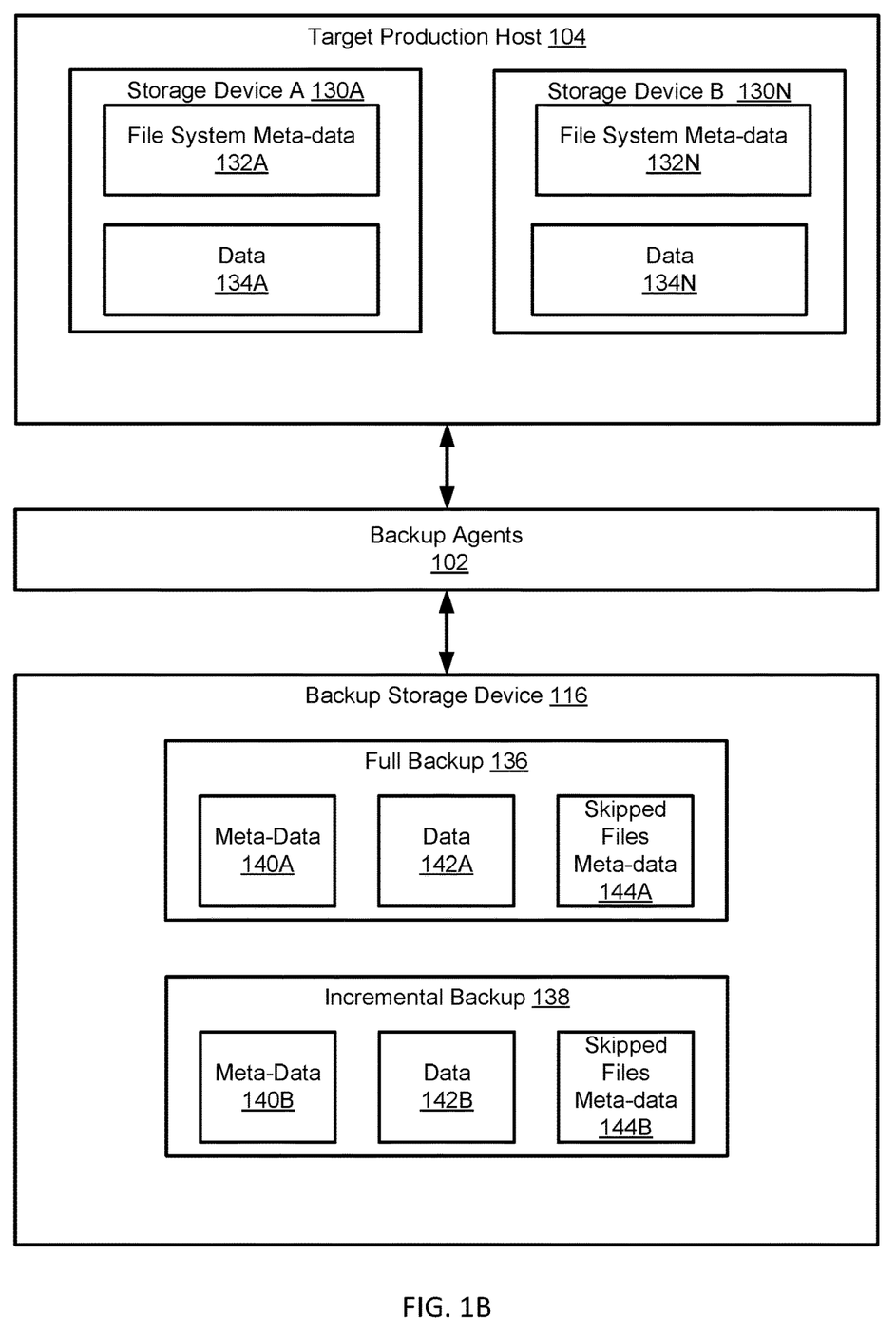
FIG. 1B shows a diagram of a backup system in accordance with one or more embodiments of the invention.

Turning now to FIG. 1B, FIG. 1B shows a diagram of specific components utilized in performing a backup of a target production host (e.g., 104) in accordance with one or more embodiments of the invention. The target production host (e.g., 104) communicates with one or more backup agents (e.g., 102) and with a backup storage device (e.g., 116). Each component illustrated in FIG. 1B is discussed below.

The target production host (e.g., 104) may be similar to the production hosts (e.g., 104, 106) as discussed above in reference to FIG. 1A. The production host (e.g., 104) may include VMs, a hypervisor, a production agent, and storage devices (e.g., 130A and 130N). The production host may include additional, fewer, and/or different components without departing from scope of the invention. Each component may be operably connected to any of the other component via any combination of wired and/or wireless connections.

As discussed above, the production host may provide computer implemented services to the client(s) (e.g., 120 in FIG. 1A) and obtain backup storage services from the backup storage device (e.g., 116). To provide and obtain the aforementioned computer implemented services and the backup storage services, the production host may include a backup agent (e.g., 102), application(s) (e.g., 112, 114 in FIG. 1A), and storage devices (e.g., 130A and 130N). The production host may include other and/or additional components without departing from the invention.

The backup storage device (116) is the same or substantially similar to the backup storage device in FIG. 1A. The backup storage device (116) stores a backup (e.g., 136, 138) created at least in part by the backup agents (e.g., 102), from the data in the target production host (e.g., 104).

The target production host (104) includes storage devices, e.g., 130A and 130N. The storage devices include a file system meta-data repository (e.g., 132A, 132N) and data (e.g., 134A, 134N). A file system meta-data repository (e.g., 132N) may be one or more data structures that include information regarding application data stored in the file system repository. The information included in the file system meta-data repository (e.g., 132A, 132N) in one or more embodiments of the invention may be used to for producing backup estimates and/or scenarios as will be described in more detail with regards to the method shown in FIG. 2. The information included in the file system meta-data repository (e.g., 132A, 132N) in one or more embodiments of the invention may be additionally used by the backup agent (e.g., 102) to generate backups and historical meta-data. The file system meta-data repository (e.g., 132A, 132N) may include other and/or additional information without departing from the invention.

The storage devices (e.g., 130A, 130N), may include one or more data structures that may be used to generate backups (e.g., 136, 138) of assets of a target file system of a target production host (e.g., 104). The file system meta-data repository e.g., 132A and 132N, may include data (also referred to as "asset data") generated by users of the application(s) (e.g., 112, 114, FIG. 1A) as discussed above. The asset data may be any type of data such as, but not limited to, database data and email data generated by users of the application(s) (e.g., 112, 114, FIG. 1A) without departing from the invention. Each application of the application(s) (e.g., 112, 114, FIG. 1A) may include any number of assets, each asset may include any quantity of asset data, and furthermore, each asset may include any number of elements without departing from the invention. Users (e.g., individuals operating the clients (120, FIG. 1A)) may use the data, e.g., 134A and 134N, stored on the storage devices, e.g., 130A and 130N, when obtaining computer implemented services from the target production host (e.g., 104). Additionally, the target data, e.g., 134A and 134N, stored on the storage devices, e.g., 130A and 130N, of the target production host (e.g., 104), may be obtained by the backup agents (e.g., 102) to generate backups. The data e.g., 134A and 134N, of the file system storage devices, e.g., 130A and 130N, may be used by other and/or additional entities for other and/or additional purposes without departing from the invention.

In one or more embodiments of the invention, the backup agents (e.g., 102) produce backups (e.g., 136 and 138) including meta-data (e.g., 140A and 140B), data (e.g., 142A and 142B), and skipped files meta-data (e.g., 144A and 144B) from the target file system of the target production host (e.g., 104). The backup agents (e.g., 102) can include intelligent file system crawlers (not shown) and/or other components as needed.

The meta-data, data, and skipped files meta-data are stored in the backup storage device (e.g., 116). The backup agents (e.g., 102) may also include the functionality to provide meta-data (e.g., 140A and 140B), data (e.g., 142A and 142B), and skipped files meta-data (e.g., 144A and 144B), to the production host (e.g., 104) for restoration purposes, history monitoring purposes, and/or other and/or additional purposes without departing from the invention. The backup agents (e.g., 102) may include other and/or additional functionalities without departing from the invention. In another embodiment of the invention, the backup agents (e.g., 102) may be located on the production host (e.g., 104).

The meta-data (e.g., 140A and 140B) of the backups (e.g., 136 and 138), may be one or more data structures such as a database, that includes information related to the original location on the target production host (e.g., 104), information related to its current location in the backup's data (e.g., 142A and 142B), relationship with other related files/applications and other pertinent information that may be configured by the user or administrator. This meta-data is produced when the backup is performed once a user or administrator selects a scenario as will be described in more detail below with regards to the method described in FIG. 2.

The skipped files meta-data (e.g., 144A and 144B) of the backups (e.g., 136 and 138) are also produced when the backup is performed. In one or more embodiments of the invention, the skipped file meta-data (e.g., 144A and 144B) takes the form of a data structure such as a database, which includes a list of those files which are skipped due to being inaccessible or due to other reasons, such as, predetermined rules established by an administrator or user when they modify a particular backup scenario's rules as will be discussed in more detail with regards to the method described in FIG. 2. The list of files which are skipped is stored in the skipped files meta-data (e.g., 144A and 144B) associated with a particular backup (e.g., 136 and 138). Alternatively other storage areas including the meta-data e.g., 140A and 140B, or file system meta-data, e.g., 132A and 132N, may be used to store the lists of skipped files, including storing the list as part of the regular meta-data (e.g., 140A, 140B).

One produced the meta-data (e.g., 140A and 140B) and skipped files meta-data (e.g., 144A and 144B) may be used for quickly determining the contents of the backup, without having to perform a full restoration. Further at the time of a restoration, by using the meta-data (e.g., 140A and 140B) and skipped files meta-data (e.g., 144A and 144B), the user or administrator can be better informed of the contents of the backup and/or use the meta-data (e.g., 140A and 140B) to determine individual files to restore from the backup rather than the entire backup.

In one or more embodiments of the invention, the backup agent (e.g., 102) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agents (e.g., 102) described throughout this application.

In one or more embodiments of the invention, the backup agents (e.g., 102) are implemented as computer instructions, e.g., computer code, stored on a persistent storage that when executed by a backup agent (e.g., 102 of FIG. 1A), causes a processor to provide the functionality of the backup agent (e.g., 102 of FIG. 1A) described throughout this application.

In one or more embodiments of the invention, the backup storage device (116) stores data related to the backup (e.g., 136 and 138). The data stored in backup storage device (116) may include backups of target data associated with applications of the target production host (e.g., 104). The backup storage device (116) may store any quantity of backups without departing from the invention. The backup storage device (116) may store full backup (e.g., 136) and incremental backup (e.g., 138). The backup storage device (116) may store other and/or additional data without departing from the invention.

The backup storage device (e.g., 116) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the backup storage device (116) may utilize portions of any combination of hard disk drives, solid state disk drives, tape drives, and/or any other physical storage medium of any number of computing devices.

Figure 2:
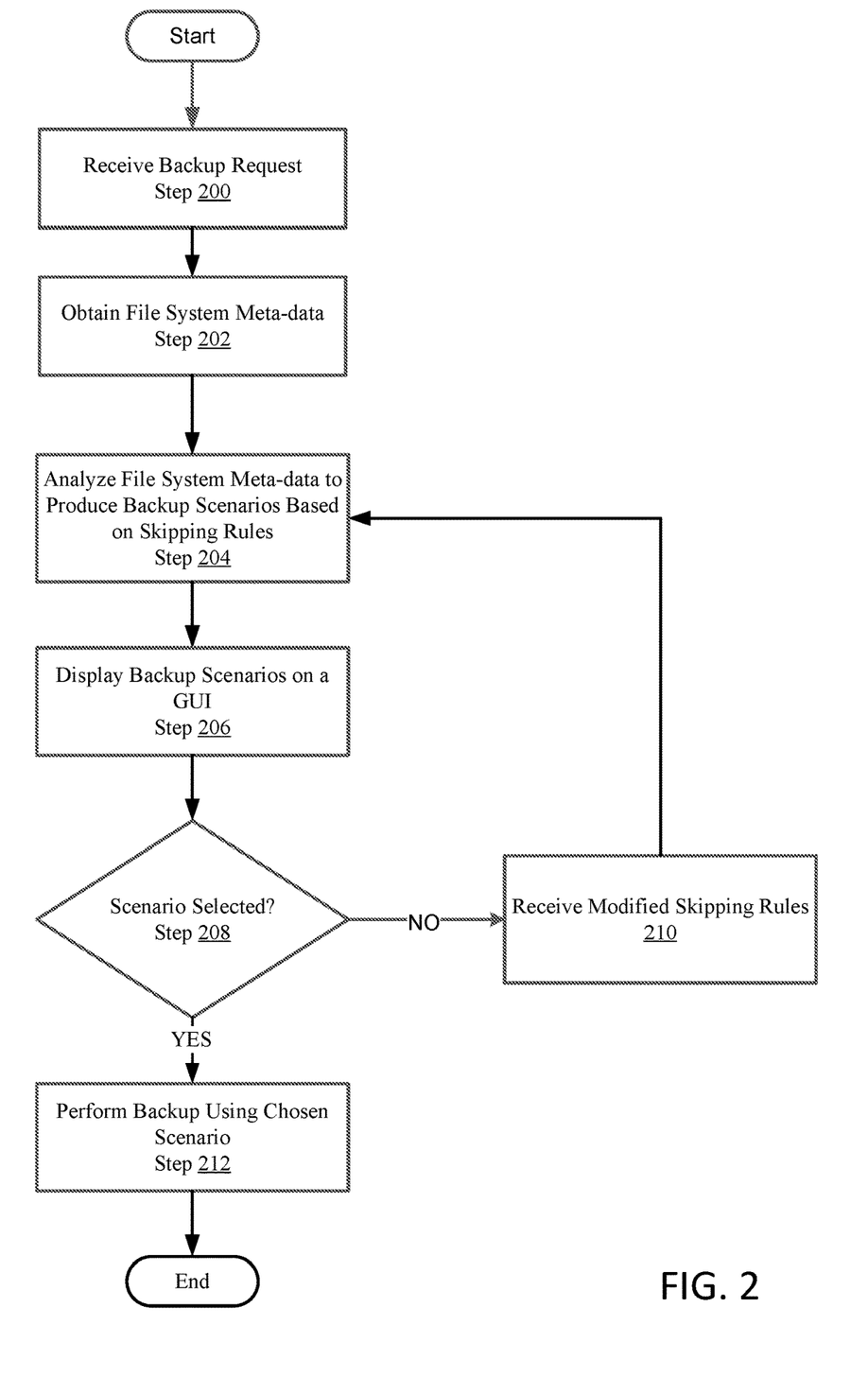
FIG. 2 shows a flowchart of a method of generating a backup in accordance with one or more embodiments of the invention.

FIG. 2 shows a method to perform a backup in accordance with one or more embodiments of the invention. While the various steps in the method are presented and described sequentially, those skilled in the art will appreciate that some or all the steps may be executed in different orders, may be combined, or omitted, and some or all steps may be executed in a parallel manner without departing from the scope of the invention.

FIG. 2 shows a flowchart of a method of generating a backup in accordance with one or more embodiments of the invention. The method may be performed by, for example, a backup agent (e.g., 102, FIG. 1A). Other components of the system illustrated in FIGS. 1A and 1B may perform all, or a portion of the method of FIG. 2 without departing from the invention.

While FIG. 2 is illustrated as a series of steps, any of the steps may be omitted, performed in a different order, additional steps may be included, and/or any or all the steps may be performed in a parallel and/or partially overlapping manner without departing from the invention.

In step 200, the system receives a backup request and begins a backup on the target production host (e.g., 104, FIG. 1B).

In one or more embodiments of the invention, the backup is started based on a backup generation event that is identified by the backup agent at a point in time specified by a backup policy associated with the generation of a backup of a target. In one or more embodiments of the invention, the backup can also or alternatively be started after the system obtains a message from a client requesting the generation of a backup of the target.

In one embodiment, the backup agent may include a backup policy associated with the target that specifies points in time to generate backups of the target file system. The backup agent may monitor the backup policy and identify when a point in time specified by the backup policy occurs. The backup policy may include an identifier associated with the target corresponding with the backup policy. The identification of the point in time specified by the backup policy may result in the identification of the backup generation event by the backup agent. In another embodiment of the invention, a user of a client may send a message to the backup agent. The message may include a request to generate a backup of the target. The message may include an identifier associated with the target. The backup agent may identify obtaining the aforementioned message as the backup generation event. The backup generation event initiating a backup of a target may be identified via other and/or additional methods without departing from the invention.

In step 202, the backup agent or other component of the system obtains the file system meta-data (e.g., 132A, 132N, FIG. 1B).

In one or more embodiments of the invention, an intelligent file system crawler or other component of the backup agents (e.g., 102, FIG. 1B) collects the file system meta-data (e.g., 132A, 132N, FIG. 1B), from the file system of the target production host (e.g., 104, FIG. 1B). Meta-data for each file and folder is collected and stored in a backup meta-data file such as e.g., 140A. This file, as previously described with regards to FIG. 1B, can take the form of a database or other similar type of file that can allow for easy analysis of the file system meta-data. The file can take other forms without deviating from the scope of the disclosed invention.

While step 202 shows this occurring after receiving a backup request, the obtaining in step 202 can occur at any time, including during a periodic discovery process. The discovery process can occur periodically at preset intervals such as every five minutes or some other unit of time as configured by a user or administrator.

Once the meta-data is obtained in step 202, the method proceeds to step 204, where the obtained meta-data is analyzed. The backup agent or other components of the system analyzes the file system meta-data to produce backup scenarios in step 204. These backup scenarios can include rules of skipping or excluding files and/or folders, as well as rules for including particular files and/or folders. Initially, the rules for the various backup scenarios can be preconfigured by either a manufacture or by an administrator during the initial setup of the system (e.g., 100, FIG. 1A), a specific application, and/or a backup agent (e.g., 102, FIG. 0.1A). The rules can include such things, as including or excluding files based on the type of file (e.g., database, picture, pdf, compressed, etc.), when the file was last modified or produced (for example the rules could exclude all files that are older than a specific time period such as, but not limited to, five years), if the file is encrypted, or any other criteria, and/or combination thereof.

In one or more embodiments of the invention, the backup agent or other component of the system calculates the approximate size as well as the amount of time to perform the backup in accordance with a particular backup scenario. This calculation can be performed using average times and compression estimates that have been determined for similar files in previous backups and comparing the files listed in the meta-data that is obtained in step 202, to those in previous backups. Alternatively, the calculation can be based on predetermined estimates for each type of file listed in the meta-data obtained in step 202, that are provided by the manufacturer or a provider of the backup agent. Other methods of obtaining approximate size as well as the amount of time to perform the backup can be used including simulating the backup in a container.

Once the meta-data is analyzed in step 204, the method proceeds to step 206, where a plurality of backup scenarios are displayed to a user or administrator. These may be displayed in the form of an interactive graphical user interface (GUI), in which a user can select or modify a particular backup scenarios. In one or more embodiments of the invention, the GUI includes listings of files that are to be excluded from a particular backup scenario, as well as information such as the size of the resulting backup and the estimated time it will take to make the resulting backup that were determined during the analysis. Other pertinent information can be displayed based on user/administrator preferences as well as criteria related to a particular application being backed up. The information in one or more embodiments of the invention can be arranged in the form of a table or by other well-known means for display and arranging data such as a graph.

If the user or administrator determines after step 206, that one of the scenarios meets their requirements, the user or administrator in step 208 can select the scenario which is then performed in step 212. Alternatively, if the user determines that none of the scenarios meet their needs and requirements, the user can alternately in step 210, modify the rules of one or more scenarios and/or include or exclude specific files and folders under one or more scenarios. Once the user or administrator has completed modified the scenario(s) and their rules, the method proceeds back to 204 and steps 204-210 repeat until a backup scenario is displayed by the GUI that is acceptable to the user or administrator.

In one or more embodiments of the invention, in step 212, the backup agent generates a backup based on the scenario chosen in step 208. The backup can take the form of a full back up or an incremental backup. Depending on the particular rules of the scenario, the backup can attempt to backup files that have been skipped in previous backups by accessing the skipped files meta-data to determine which files to include in the backup that might normally be skipped due to other rules that previously precluded the files or other issues (such as a file be inaccessible when previous backups were performed). Other resources can be used for performing the backup such as backup meta-data and file system meta-data.

The method may end following step 212.

Additionally, as discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many distinct types of computing devices exist, and the input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to generating backups of applications. More specifically, various embodiments of the invention may determine based on a file system's meta-data that specific files and/or folders will not be backed up in accordance with a backup's current rules or configuration. The aforementioned information may be stored, e.g., in a file, as a list of files and/or folders that will not be backed up along with other meta-data. This data can then be used to notify a user or administrator what files and/or folders will not be backed up and based on that notification, they may make changes to the backup's current rules or configuration.

This advantageously provides the user or administrator knowledge of gaps in the protection provided by a backup and the ability to re-configure it to meet their needs. Thus, embodiments of the invention may address the problem of skipped files and folders when performing a backup. This problem arises due to the technological nature of the specific applications that are being backed up.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for performing a backup, the method comprising:
    initiating, by a user of a target production host, a backup of the target production host;
    using at least meta-data of a file system of the target production host, to produce a plurality of backup scenarios,
        wherein each of the plurality of backup scenarios comprises a time to perform a backup operation associated with the one of the plurality of backup scenarios, wherein the time to perform the backup operation associated with a backup scenario of the plurality of backup scenarios is determined using average times that have been determined for previous backup operations associated with the backup scenario;
        wherein the plurality of backup scenarios is based on one or more predetermined rules associated with at least one of the plurality of backup scenarios, and
        wherein the one or more predetermined rules comprises an encryption status and a time of last modification specified in the meta-data of the file system, wherein the meta-data is associated with files in the file system;
    displaying the plurality of backup scenarios to the user;
    receiving from the user instructions to modify one or more of the plurality of backup scenarios;
    modifying the one or more of the plurality of backup scenarios as instructed by the user;
    displaying the modified one or more of the plurality of backup scenarios to the user;
    receiving from the user a selection of one of the modified one or more of the plurality of backup scenarios; and
    performing the backup of the target production host based on the selection of one of the modified one or more of the plurality of backup scenarios.

2. The method of claim 1, wherein the displaying the plurality of backup scenarios to the user comprises displaying one or more files or folders that will not be backed up in at least one of the plurality of backup scenarios.

3. The method of claim 1, wherein the displaying the plurality of backup scenarios to the user comprises of displaying the plurality of backup scenarios on an interactive graphical user interface.

4. The method of claim 1, wherein the modifying the one or more of the plurality of backup scenarios further comprises of receiving from the user a change to the one or more predetermined rules associated with the one or more of the plurality of backup scenarios.

5. The method of claim 4, wherein a result of the changes to the one or more predetermined rules associated with the one or more of the plurality of backup scenarios, is displayed to the user.

6. The method of claim 1, wherein the modifying the one or more of the plurality of backup scenarios further comprises of receiving from the user an instruction to include or exclude at least one of the files or folders in the one or more of the plurality of backup scenarios.

7. The method of claim 1, wherein the meta-data is obtained during a discovery that is performed periodically.

8. A non-transitory computer readable medium comprising computer readable program code, which when executed by a computer processor enables the computer processor to perform a method for performing a backup, the method comprising:
    initiating, by a user of a target production host, a backup of the target production host;
    using at least meta-data of a file system of the target production host, to produce a plurality of backup scenarios,
        wherein each of the plurality of backup scenarios comprises a time to perform a backup operation associated with the one of the plurality of backup scenarios, wherein the time to perform the backup operation associated with a backup scenario of the plurality of backup scenarios is determined using average times that have been determined for previous backup operations associated with the backup scenario;
        wherein the plurality of backup scenarios is based on one or more predetermined rules associated with at least one of the plurality of backup scenarios, and
        wherein the one or more predetermined rules comprises an encryption status and a time of last modification specified in the meta-data of the file system, wherein the meta-data is associated with files in the file system;
    displaying the plurality of backup scenarios to the user;
    receiving from the user instructions to modify one or more of the plurality of backup scenarios;
    modifying the one or more of the plurality of backup scenarios as instructed by the user;
    displaying the modified one or more of the plurality of backup scenarios to the user;
    receiving from the user a selection of one of the modified one or more of the plurality of backup scenarios; and
    performing the backup of the target production host based on the selection of one of the modified one or more of the plurality of backup scenarios.

9. The non-transitory computer readable medium of claim 8, wherein the displaying the plurality of backup scenarios to the user comprises displaying one or more files or folders that will not be backed up in at least one of the plurality of backup scenarios.

10. The non-transitory computer readable medium of claim 8, wherein the displaying the plurality of backup scenarios to the user comprises of displaying the plurality of backup scenarios on an interactive graphical user interface.

11. The non-transitory computer readable medium of claim 8, wherein the modifying the one or more of the plurality of backup scenarios further comprises of receiving from the user a change to the one or more predetermined rules associated with the one or more of the plurality of backup scenarios.

12. The non-transitory computer readable medium of claim 11, wherein a result of the changes to the one or more predetermined rules associated with the one or more of the plurality of backup scenarios, is displayed to the user.

13. The non-transitory computer readable medium of claim 8, wherein the modifying the one or more of the plurality of backup scenarios further comprises of receiving from the user an instruction to include or exclude at least one of the files and/or folders in the one or more of the plurality of backup scenarios.

14. A system comprising:
- a storage device associated with a target production host which includes a target file system comprising of files and folders;
- a processor; and
- memory comprising instructions, which when executed by the processor, perform a method for performing a backup comprising:
  - initiating, by a user of a target production host, a backup of the target production host;
  - using at least meta-data of a file system of the target production host, to produce a plurality of backup scenarios,
    - wherein each of the plurality of backup scenarios comprises a time to perform a backup operation associated with the one of the plurality of backup scenarios, wherein the time to perform the backup operation associated with a backup scenario of the plurality of backup scenarios is determined using average times that have been determined for previous backup operations associated with the backup scenario;
    - wherein the plurality of backup scenarios is based on one or more predetermined rules associated with at least one of the plurality of backup scenarios, and
    - wherein the one or more predetermined rules comprises an encryption status and a time of last modification specified in the meta-data of the file system, wherein the meta-data is associated with files in the file system;
  - displaying the plurality of backup scenarios to the user;
  - receiving from the user instructions to modify one or more of the plurality of backup scenarios;
  - modifying the one or more of the plurality of backup scenarios as instructed by the user;
  - displaying the modified one or more of the plurality of backup scenarios to the user;
  - receiving from the user a selection of one of the modified one or more of the plurality of backup scenarios; and
  - performing the backup of the target production host based on the selection of one of the modified one or more of the plurality of backup scenarios.

15. The system of claim 14, wherein the displaying the plurality of backup scenarios to the user comprises displaying one or more files or folders that will not be backed up in at least one of the plurality of backup scenarios.

16. The system of claim 14, wherein the modifying the one or more of the plurality of backup scenarios further comprises of receiving from the user a change to the one or more predetermined rules associated with the one or more of the plurality of backup scenarios.

17. The system of claim 14, wherein the modifying the one or more of the plurality of backup scenarios further comprises of receiving from the user an instruction to include or exclude at least one of the files and/or folders in the one or more of the plurality of backup scenarios.

\* \* \* \* \*